United States Patent

Harris

[15] 3,670,229

[45] June 13, 1972

[54] BATTERY CHARGING SYSTEMS

[72] Inventor: Paul Anthony Harris, Walsall, England

[73] Assignee: Joseph Lucas (Industries) Limited, Birmingham, England

[22] Filed: Nov. 20, 1970

[21] Appl. No.: 91,414

[30] Foreign Application Priority Data

Dec. 2, 1969 Great Britain..................58,725/69

[52] U.S. Cl....................................320/59, 320/61, 322/28
[51] Int. Cl..............................................H02j 7/06
[58] Field of Search.................322/28; 320/39, 40, 53, 59, 320/60, 61, 1

[56] References Cited

UNITED STATES PATENTS 3,315,141  4/1967  Wright et al. ..................320/40 X
3,524,997  8/1970  Harnden, Jr. et al. ..............307/293 X
3,349,318  10/1967  Poppinger............................320/39 X

*Primary Examiner*—L. T. Hix
*Assistant Examiner*—Robert J. Hickey
*Attorney*—Holman & Stern

[57] ABSTRACT

A battery charging system of the kind using a permanent magnet alternator with its output controlled by thyristors associated with a full wave rectifier has an oscillator controlled by voltage sensitive means for determining whether or not the thyristors conduct. The oscillator operates through the intermediary of a capacitor which is charged by the oscillator and discharges through the gate-cathodes of the thyristors, and the discharge path includes a load in the collector circuit of an output transistor in the oscillator. This collector load is bridged by a low resistance path so that the collector load does not reduce the discharge current of the capacitor.

2 Claims, 1 Drawing Figure

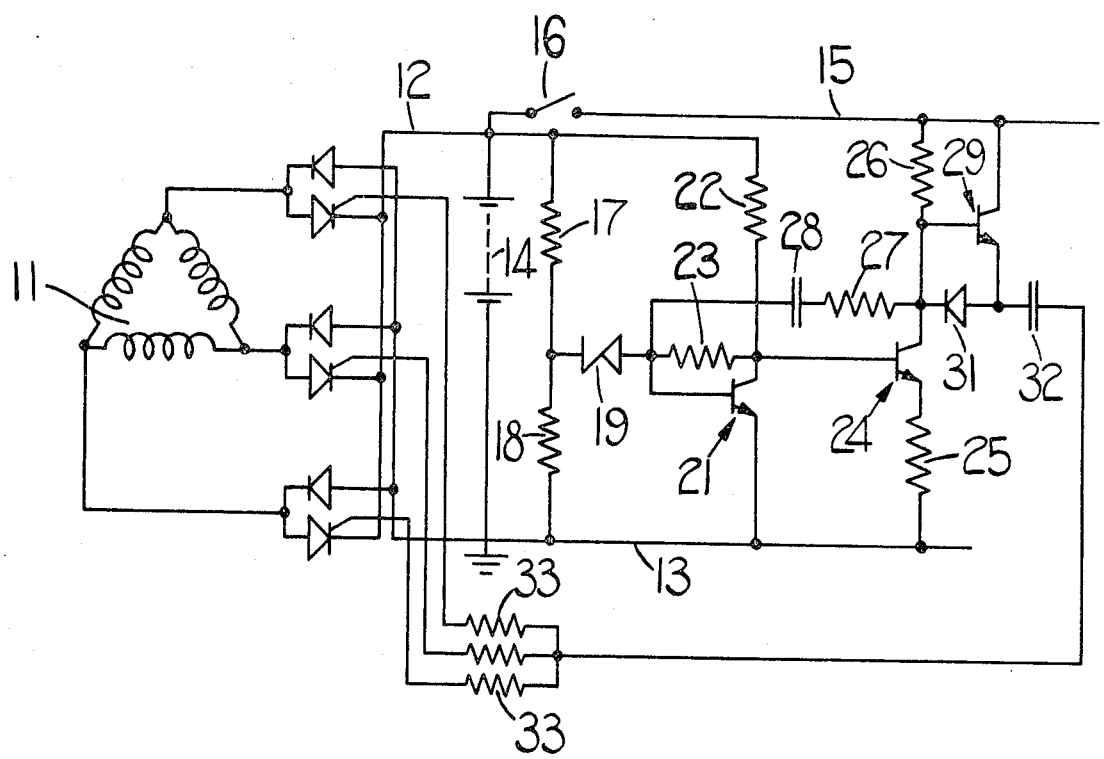

BATTERY CHARGING SYSTEMS

This invention relates to battery charging systems for road vehicles.

A battery charging system according to the invention comprises in combination a permanent magnet alternator for charging the battery, a full wave rectifier coupling the alternator to the battery, thyristors associated with the full wave rectifier for controlling the supply of power from the alternator to the battery, an oscillator including an input transistor and an output transistor, a resistive load in the collector circuit of the output transistor limiting current flow through the output transistor, a capacitor which is charged by the oscillator and discharges through the gate-cathode paths of the thyristors to turn them on, said discharge path including said collector load, but the collector load being bridged by a low resistance path so that the collector load does not reduce the discharge current of the capacitor, and voltage sensitive means controlling operation of the oscillator to regulate the battery voltage.

The accompanying drawing is a circuit diagram illustrating one example of the invention.

Referring to the drawing, a permanent magnet alternator 11 supplies power through a full wave rectifier consisting of three diodes and three thyristors to a positive supply line 12 and a negative supply line 13, which conveniently is earthed. The battery 14 of the vehicle is connected between the lines 12, 13 and provides power to a further positive supply line 15 by way of the ignition switch 16 of the vehicle.

Connected in series between the lines 12, 13 are a pair of resistors 17, 18 the junction of which is connected through a Zener diode 19 to the base of an NPN transistor 21 having its emitter connected to the line 13 and its collector connected through a resistor 22 to the line 12. The collector and base of the transistor 21 are interconnected through a resistor 23, and the collector is further connected to the base of an NPN transistor 24, having its emitter connected to the line 13 through a resistor 25, and its collector connected through a resistor 26 to the line 15. The collector of the transistor 24 is connected through a resistor 27 and a capacitor 28 in series to the transistor 21, and is further connected to the base of an NPN transistor 29 having its collector connected to the line 15 and its emitter connected through a diode 31 to the collector of the transistor 24, and further connected to one side of the capacitor 32. The other side of the capacitor 32 is connected through three individual resistors 33 to the gates of the thyristors respectively.

Assuming for the moment that the output voltage of the battery 14 is below a predetermined value, then the Zener diode 19 is non-conductive, and the transistors 21 and 24 and their associated components oscillate. When the transistor 24 is on, the capacitor 32 is charged by way of the resistor 25, the diode 31 and the gate-cathode paths of the thyristors, the current flow through the gate-cathode paths being in the direction which will not turn the thyristors on. With the transistor 24 off, the capacitor 32 discharges by way of the resistors 33, the gate-cathodes paths of the thyristors and the transistor 29, which is held on by current flow through the resistor 26, so turning on any thyristor which at that moment is forward biased. Each thyristor turns off again as soon as it is reverse biased, but as long as the oscillator is operating pulses are supplied to the gate-cathode circuits of the thyristors at a sufficiently high frequency to keep the thyristors conducting, so that the thyristors and diodes together constitute a full wave rectifier. However, when the battery voltage exceeds a predetermined value, the Zener diode 19 conducts, turning on the transistor 21 so that the oscillator ceases to operate, and each thyristor turns off as soon as it is reverse biased and remains off until the battery voltage falls again, so that the Zener diode 19 stops conducting and the transistors 21 and 24 again oscillate.

If at any time the battery leads become disconnected, then the smoothing effect of the battery is lost, and the voltage between the lines 12 and 13 will rise rapidly. The rise in voltage will turn on the Zener diode 19, thereby turning off the oscillator, so that each thyristor turns off as soon as it is reverse biased, and damage to components in the system is prevented.

The purpose of the resistor 26 is to limit current flowing through the transistor 24, so that the size of the transistor 24 is kept to a minimum and there are no problems with heat dissipation. However, using a large resistor 26, it becomes necessary to employ the transistor 29 or some other device providing a low resistance path so that the resistor 26 does not limit the discharge current of the capacitor 32. The diode 31 isolates the base and emitter of the transistor 29 when the transistor 24 is off. A further advantage of having a large resistor 26 is that the resistors 17 and 22 can be permanently connected to the battery 14, their values being so chosen that the battery current drain is negligible. If the lead connecting resistors 17 and 22 becomes disconnected from the battery the oscillator will no longer provide output pulses to the gates of the thyristor and the machine output will fall to zero

I claim:

1. A battery charging system for a road vehicle, comprising in combination a permanent magnet alternator for charging the battery, a full wave rectifier coupling the alternator to the battery, thyristors associated with the full wave rectifier for controlling the supply of power from the alternator to the battery, an oscillator including an input transistor and an output transistor, a resistive load in the collector circuit of the output transistor limiting current flow through the output transistor, a capacitor which is charged by the oscillator and discharges through the gate-cathode paths of the thyristors to turn them on, said discharge path including said collector load, a variable resistance path, normally having a high resistance, bridging the collector load, said path having a low resistance during discharge of the capacitor so that the collector load does not reduce the discharge current of the capacitor, and voltage sensitive means controlling operation of the oscillator to regulate the battery voltage.

2. A system as claimed in claim 1 in which the low resistance path is provided by a transistor.

* * * * *